(12) United States Patent
Aoki et al.

(10) Patent No.: US 8,478,001 B2
(45) Date of Patent: Jul. 2, 2013

(54) IMAGE PROCESSING APPARATUS

(75) Inventors: Yasuhiro Aoki, Kawasaki (JP); Masami Mizutani, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/217,434

(22) Filed: Aug. 25, 2011

(65) Prior Publication Data

US 2012/0121137 A1    May 17, 2012

(30) Foreign Application Priority Data

Nov. 12, 2010  (JP) ................................. 2010-254199

(51) Int. Cl.
  *G06K 9/00*  (2006.01)
(52) U.S. Cl.
  USPC ........................................................ 382/106
(58) Field of Classification Search
  USPC .................................................. 382/100, 106
  See application file for complete search history.

(56) References Cited

U.S. PATENT DOCUMENTS

| | | |
|---|---|---|
| 5,499,306 A | 3/1996 | Sasaki et al. |
| 6,717,683 B1 | 4/2004 | Wakashiro et al. |
| 7,613,361 B2 * | 11/2009 | Anabuki et al. ............... 382/287 |

FOREIGN PATENT DOCUMENTS

| | | |
|---|---|---|
| JP | 06-258028 A | 9/1994 |
| JP | 2000-105120 A | 4/2000 |

OTHER PUBLICATIONS

Quan, Long et al., "Linear N-Point Camera Pose Determination", IEEE Transactions on Pattern Analysis and Machine Intelligence, vol. 21, No. 8, Aug. 1999; pp. 774-780.

* cited by examiner

*Primary Examiner* — Shefali Goradia
(74) *Attorney, Agent, or Firm* — Fujitsu Patent Center

(57) ABSTRACT

An image processing program causes a computer to execute processing of obtaining an image, photographed with a camera, of markers disposed in a real space, creating vectors from the camera and to the markers, selecting a reference marker from the markers, calculating a inner product of the vectors, canceling use of a negative sign included in an equation that obtains a distance between the camera and a remaining marker, creating sign patterns based on to the cancelled remaining markers, setting a first distance between the reference marker and the camera, calculating candidates of a distance between the camera and the remaining markers, calculating error between an inter-marker distance in a real space and the sign patterns, calculating other error when a second distance is set, determining the distance according to the error and the other error, and calculating a position and pose of the camera according to the determined distance.

6 Claims, 14 Drawing Sheets

FIG. 5

| REFERENCE POINT | DISTANCE SETTING TO REFERENCE POINT | POINT 0 | POINT 1 | POINT 2 | POINT 3 | ERROR E |
|---|---|---|---|---|---|---|
| POINT 0 | L | | + | + | + | |
| | | | + | + | − | |
| | | | + | − | + | |
| | | | + | − | − | |
| | | | − | + | + | |
| | | | − | + | − | |
| | | | − | − | + | |
| | | | − | − | − | |

FIG. 6

| REFERENCE POINT | DISTANCE SETTING TO REFERENCE POINT | POINT 0 | POINT 1 | POINT 2 | POINT 3 | ERROR E |
|---|---|---|---|---|---|---|
| POINT 0 | L | | + | + | + | |
| | | | + | + | − | |
| | | | + | − | + | |
| | | | + | − | − | |
| | | | − | + | + | |
| | | | − | + | − | |
| | | | − | − | + | |
| | | | − | − | − | |

FIG. 7

| REFERENCE POINT | DISTANCE SETTING TO REFERENCE POINT | POINT 0 | POINT 1 | POINT 2 | POINT 3 | ERROR E |
|---|---|---|---|---|---|---|
| POINT 0 | L |  | + | + | + | E000 |
|  |  |  | + | + | − | E001 |
|  |  |  | + | − | + | E002 |
|  |  |  | + | − | − | E003 |
|  |  |  | − | + | + |  |
|  |  |  | − | + | − |  |
|  |  |  | − | − | + |  |
|  |  |  | − | − | − |  |

FIG. 8

| REFERENCE POINT | DISTANCE SETTING TO REFERENCE POINT | POINT 0 | POINT 1 | POINT 2 | POINT 3 | ERROR E | MINIMUM ERROR |
|---|---|---|---|---|---|---|---|
| POINT 0 | L |  | + | + | + | E000 | min (E000 TO E003) |
|  |  |  | + | + | − | E001 |  |
|  |  |  | + | − | + | E002 |  |
|  |  |  | + | − | − | E003 |  |
|  |  |  | − | + | + |  |  |
|  |  |  | − | + | − |  |  |
|  |  |  | − | − | + |  |  |
|  |  |  | − | − | − |  |  |

FIG. 9

| REFERENCE POINT | DISTANCE SETTING TO REFERENCE POINT | POINT 0 | POINT 1 | POINT 2 | POINT 3 | ERROR E | MINIMUM ERROR |
|---|---|---|---|---|---|---|---|
| POINT 0 | L | | + | + | + | E000 | min (E000 TO E003) |
| | | | + | + | − | E001 | |
| | | | + | − | + | E002 | |
| | | | + | − | − | E003 | |
| | | | − | + | + | | |
| | | | − | + | − | | |
| | | | − | − | + | | |
| | | | − | − | − | | |
| | L+ΔL | | + | + | + | E010 | min (E010 TO E013) |
| | | | + | + | − | E011 | |
| | | | + | − | + | E012 | |
| | | | + | − | − | E013 | |
| | | | − | + | + | | |
| | | | − | + | − | | |
| | | | − | − | + | | |
| | | | − | − | − | | |
| | | | ... | | | | |

FIG. 10

| REFERENCE POINT | DISTANCE SETTING TO REFERENCE POINT | POINT 0 | POINT 1 | POINT 2 | POINT 3 | ERROR E | MINIMUM ERROR |
|---|---|---|---|---|---|---|---|
| POINT 0 | L |  | + | + | + | E000 | min (E000 TO E003) |
|  |  |  | + | + | − | E001 |  |
|  |  |  | + | − | + | E002 |  |
|  |  |  | + | − | − | E003 |  |
|  |  |  | − | + | + |  |  |
|  |  |  | − | + | − |  |  |
|  |  |  | − | − | + |  |  |
|  |  |  | − | − | − |  |  |
|  | L+ΔL |  | + | + | + | E010 | min (E010 TO E013) |
|  |  |  | + | + | − | E011 |  |
|  |  |  | + | − | + | E012 |  |
|  |  |  | + | − | − | E013 |  |
|  |  |  | − | + | + |  |  |
|  |  |  | − | + | − |  |  |
|  |  |  | − | − | + |  |  |
|  |  |  | − | − | − |  |  |
|  | ... |  |  |  |  |  |  |
| POINT 1 | L' | + |  | + | + | E020 | min (E020 TO E02v) |
|  |  | + |  | + | − | E021 |  |
|  | ... |  |  |  |  |  |  |

RELATED ART

IMAGE PROCESSING APPARATUS

CROSS-REFERENCE TO RELATED APPLICATION

This application is based upon and claims the benefit of priority of the prior Japanese Patent Application No. 2010-254199, filed on Nov. 12, 2010 the entire contents of which are incorporated herein by reference.

FIELD

The embodiments discussed herein are related to an image processing apparatus.

BACKGROUND

Technology that three-dimensionally recognizes images photographed with a camera has been recently put into practical use. This technology is used to, for example, create a spherical image or another image that covers the entire periphery in a vehicle by using images photographed with an on-board camera mounted on the vehicle. The technology is also used to create an image that enables the position of the robot relative to a target to be determined by using images photographed with a camera mounted on a robot.

When a three-dimensionally image is created from images photographed with a camera by using the technology that three-dimensionally recognizes images photographed with a camera, information about the pose and position of the installed camera may need to have been correctly grasped. Known technology 1 and known technology 2 described below are used to estimate information about the pose and position of an installed camera.

Above-mentioned known technology 1 will be described with reference to FIG. 17. FIG. 17 is a drawing that illustrates known technology 1. In known technology 1, objects such as markers are first placed in prescribed positions in the real space, in other words, prescribed positions in the world coordinate system, and photographed with a camera. Then, known technology 1 extracts three points ($P_o$, $P_1$, $P_2$) corresponding to three points ($x_o$, $x_1$, $x_2$) on an image plane H obtained by photographing the markers, as depicted in FIG. 17. These three points ($P_o$, $P_1$, $P_2$) are three-dimensional positions, corresponding to three points ($x_o$, $x_1$, $x_2$) on the image plane H, in a camera coordinate system. Known technology 1 creates simultaneous equations to formulate the surfaces of a triangular pyramid, which is formed by interconnecting three points ($P_o$, $P_1$, $P_2$) and the origin C of the camera coordinate system, as depicted in FIG. 17. For example, the surfaces of the triangular pyramid formed by interconnecting three points ($P_o$, $P_1$, $P_2$) and the origin C can be represented by formulated equations according to the cosine formula. Simultaneous equations (1) indicated below are created from these formulated equations. The distance between the origin C and point $P_o$ will be denoted $L_o$, the distance between the origin C and point $P_1$ will be denoted $L_1$, the distance between the origin C and point $P_2$ will be denoted $L_2$, the eye line vector from origin C to point $P_o$ will be denoted $V_o$, the eye line vector from origin C to point $P_1$ will be denoted $V_1$, and the eye line vector from origin C to point $P_2$ will be denoted $V_2$. The eye line vectors ($V_o$, $V_1$, $V_2$) are obtained from the optical axis position and focal length of the camera and other internal parameters. $<(V_i, V_j)$ (i, j=0, 1, 2, i≠j) in equation (1) below represents the inner product of vector $V_i$ and vector $V_j$. $D_{0,1}$, $D_{0,2}$, and $D_{1,2}$ in equation (1) each represent an actual distance between two points among points $P_o$ to $P_2$.

[Equation 1]

$$L_0^2 + L_1^2 + 2L_0 L_1 \langle v_0, v_1 \rangle = D_{0,1}^2$$

$$L_0^2 + L_2^2 + 2L_0 L_2 \langle v_0, v_2 \rangle = D_{0,2}^2$$

$$L_1^2 + L_2^2 + 2L_1 L_2 \langle v_1, v_2 \rangle = D_{1,2}^2 \qquad (1)$$

Next, know technology 1 obtains the solution of the quartic equation derived from the above simultaneous equations (1) to obtain distances $L_o$, $L_1$, and $L_2$ from the origin C in the camera coordinate system in FIG. 17 to three points ($P_o$, $P_1$, $P_2$). Know technology 1 then uses the distances from the origin C to three points ($P_o$, $P_1$, $P_2$) and eye vectors ($V_o$, $V_1$, $V_2$) obtained from the internal parameters of the camera to derive the position and pose of the camera by an inverse operation.

Alternatively, known technology 2, for example, extracts feature points on an image on which objects such as markers are photographed with a camera, and sets a search area corresponding to a substantially estimated position of the camera on the basis of the correspondence between the feature points on the image and the view patterns of the objects. Known technology 2 then searches the search area for an optimum solution that meets required error precision for a total six parameters related to the position and pose of the camera to detect the position and pose of the camera.

Japanese Laid-open Patent Publication No. 6-258028 is an example of related art.

Quan and Lan, "Linear N-Point Camera Pose Determination", IEEE trans. on PAMI, 1999 is another example of related art.

SUMMARY

According to an aspect of the invention, a non-transitory storage medium stores an image processing program causing a computer to execute processing of obtaining an image, photographed with a camera, of at least four markers disposed in a real space, creating vectors, which correspond to the at least four markers, from the camera according to internal parameters including information about a focal length and a optical axis position of the camera and to the positions of the at least four markers on the image, selecting a reference marker from the at least four markers, calculating a inner product of a vector for the reference marker and a vector for each of remaining markers other than the reference marker, canceling, for markers, other than the reference marker, for which the sign of the inner product is negative, use of a negative sign included in an equation representing a solution of a quadratic equation that obtains a distance between the camera and a marker other than the reference marker by using the reference marker, creating sign patterns, for all markers other than the reference marker, by combining signs included in equations corresponding to the markers other than the reference marker according to a result of cancelling the use of the negative sign, setting a first value as a distance between the reference marker and the camera, calculating one or two candidates of a distance between the camera and each of the markers other than the reference marker, for the first value, by using the first value, the quadratic equation, and the result of cancelling the use of the negative sign, calculating error between an inter-marker distance in a real space and an inter-marker distance calculated according to each of the sign patterns and the one or two candidates, for each of the sign patterns, calculating other error for each of the sign patterns when a second value, which is different from the first value, is set, determining the distance between the camera and each of the at least four markers according to the error calculated when the first value is selected and to the other error calculated when the second value is selected, and calculating a position and a pose of the camera in a world coordinate system according to the determined distance between the camera and each of the at least four markers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a drawing used to describe a deriving unit in the first embodiment.

FIG. 6 conceptually illustrates a process executed by a discarding unit in the first embodiment.

FIG. 7 conceptually illustrates a process executed by a calculating unit in the first embodiment.

FIG. 8 conceptually illustrates another process executed by the calculating unit in the first embodiment.

FIG. 9 conceptually illustrates yet another process executed by the calculating unit in the first embodiment.

FIG. 10 conceptually illustrates still another process executed by the calculating unit in the first embodiment.

DESCRIPTION OF EMBODIMENTS

An image processing program in an embodiment and an image processing apparatus in another embodiment of this disclosure will be described below with reference to the drawings. In the description below, technology in an embodiment will be described that estimates the position and pose of a camera from an image including four markers placed at known three-dimensional positions in the world coordinate system, which is the real space, that have been photographed with a camera mounted on a vehicle, robot, or the like. There is no limitation on the number of markers if that number is four or more. In the embodiments below, the real space will be described as the three-dimensional space. The technology in the disclosure is not limited by the embodiments, described below, of the image processing program and image processing apparatus in the disclosure. The embodiments can be appropriately combined unless there is a conflict among them.

In known technology 1 described above, the solution of a quartic equation must be obtained to obtain the distances from the three extracted points to the origin of the camera coordinate system, so much calculation must be carried out. As a result, information about the pose and position of the installed camera cannot be quickly obtained. Another problem with known technology 1 is that since singular value decomposition is used to solve the quartic equation and obtain the distances to the origin in the camera coordinate system, an area in which to store specialized numeric calculation libraries and the like is needed, so known technology 1 is not practical.

Known technology 2 described above is also problematic in that since a search for the optimum solution is made for a total of six parameters about the position and pose of the camera, a local solution is likely to be obtained and thereby precise information about the pose and position of the installed camera cannot necessarily be obtained.

First Embodiment

Figure 1:
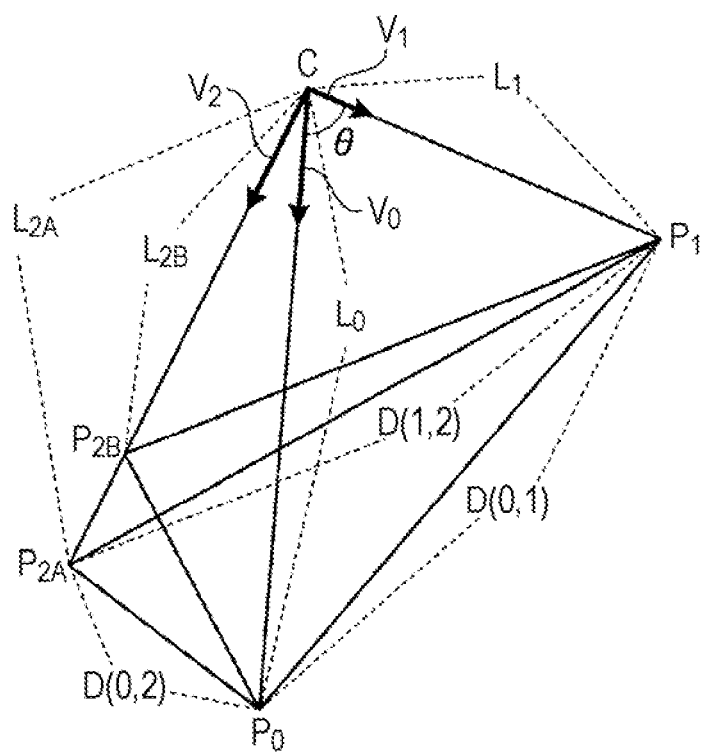
FIG. 1 is a drawing used to describe an image processing apparatus in a first embodiment.

The image processing apparatus in a first embodiment will be described with reference to FIG. 1 before the structure of the image processing apparatus in the first embodiment is described. FIG. 1 is a drawing used to describe the image processing apparatus in the first embodiment. Although, in the embodiment described below, four markers are placed at known four three-dimensional positions in the world coordinate system, FIG. 1 focuses on only three of the four placed markers to simplify the description.

In FIG. 1, the origin of the camera coordinate system is denoted C, and virtual three-dimensional positions (corresponding points), in the camera coordinate system, that corresponds to three markers, are denoted $P_o$, $P_1$, $P_{2A}$, and $P_{2B}$, the virtual three-dimensional positions being part of points on an image plane on which four markers are projected. $P_{2A}$ and $P_{2B}$ are equivalent to candidates that can be taken as three-dimensional positions, in the camera coordinate system, that correspond to points on the image plane. $P_o$, $P_1$, $P_{2A}$, and $P_{2B}$ in FIG. 1 will be respectively referred to below as corresponding point $P_o$, corresponding point $P_1$, corresponding point $P_{2A}$, and corresponding point $P_{2B}$. $V_o$, $V_1$, and $V_2$ in FIG. 1 are eye line vectors extending from the origin C toward corresponding point $P_o$, corresponding point $P_1$, and corresponding points $P_{2A}$ and $P_{2B}$, respectively. For example, these vectors are unit vectors with a length of 1. In the description with reference to FIG. 1, $V_o$, $V_1$, and $V_2$ in FIG. 1 will be respectively referred to below as vector $V_o$, vector $V_1$, and vector $V_2$.

In FIG. 1, the distance between the origin C and corresponding point $P_o$ is denoted $L_0$, the distance between the origin C and corresponding point $P_1$ is denoted $L_1$, the distance between the origin C and corresponding point $P_{2A}$ is denoted $L_{2A}$, and the distance between the origin C and corresponding point $P_{2B}$ is denoted $L_{2B}$. In the description with reference to FIG. 1, $L_o$, $L_1$, $L_{2A}$, and $L_{2B}$ in FIG. 1 will be respectively referred to below as distance $L_o$, distance $L_1$, distance $L_{2A}$, and distance $L_{2B}$.

In FIG. 1, $D(0, 1)$ represents an actual distance in the three-dimensional space between corresponding point $P_o$ and corresponding point $P_1$, $D(0, 2)$ represents an actual distance in the three-dimensional space between corresponding point $P_o$ and corresponding point $P_2$, and $D(1, 2)$ represents an actual distance in the three-dimensional space between corresponding point $P_1$ and corresponding point $P_2$. In the description with reference to FIG. 1, D(0, 1), D(0, 2), and D(1, 2) in FIG. 1 will be referred to below as the actual distance D(0, 1), actual distance D(0, 2), and actual distance D(1, 2).

When the image processing apparatus in the first embodiment selects corresponding point $P_o$, it first sets simultaneous equations that formulate distances $L_1$ and $L_2$ by using distance $L_o$ according to the cosine formula. These simultaneous equations are represented by equations (2) below, for example. $D_{0,1}$ and $D_{0,2}$ in equations (2) respectively correspond to D(0, 1) and D(0, 2) in FIG. 1.

[Equation 2]

$$L_1 = \langle v_0, v_1 \rangle L_0 \pm \sqrt{D_{0,1}^2 - L_0^2(1 - \langle v_0, v_1 \rangle^2)}$$

$$L_2 = \langle v_0, v_2 \rangle L_0 \pm \sqrt{D_{0,2}^2 - L_0^2(1 - \langle v_0, v_2 \rangle^2)} \quad (2)$$

If the value of distance $L_o$ is given, the solutions of the first equation of equations (2) above are obtained, deriving two values as the values of distance $L_1$. Specifically, the two values are derived by selecting the positive sign placed between the inner product term in the right side of the equation that formulates distance $L_1$ and the radical symbol term therein as the sign of the value of distance $L_1$ and by selecting the negative sign. Similarly, two values are derived as the values of distance $L_2$ by obtaining the solutions of the second equation of equations (2) above. That is, the value of distance $L_1$ is determined according to the selected sign between the inner product term in the right side of the equation that formulates distance $L_1$ and the radical symbol term therein. Similarly, the value of distance $L_2$ is determined according to the selected sign between the inner product term in the right side of the equation that formulates distance $L_2$ and the radical symbol term therein. Thus, the image processing apparatus in the first embodiment derives sign patterns, in each of which one of the signs placed before the radical symbol in the right side of the equation that formulates distance $L_1$ and one of the signs placed before the radical symbol in the right side of the equation that formulates distance $L_2$ are combined. The image processing apparatus in the first embodiment discards sign patterns which prevent distances $L_1$ and $L_2$ from taking appropriate values.

When distances $L_1$ and $L_2$ are given by equations (2) above, the image processing apparatus in the first embodiment derives four sign patters (+, +), (−, −), (+, −), and (−, +), for example. The image processing apparatus in the first embodiment then discards sign patterns which prevent at least one of distances $L_1$ and $L_2$ from taking an appropriate value. If, for example, the angle θ between vector $V_o$ and vector $V_1$ in FIG. 1 is larger than 90 degrees, the value of the inner product in the right side of the equation that represents distance $L_1$ becomes negative. In this case, if the negative sign is selected as the sign placed before the radical symbol in equation (2), the calculated value of distance $L_1$ becomes negative, so the value is not appropriate as the value of distance $L_1$. That is, since the first term in the right side is always negative, unless at least positive values are used in the sign pattern, the right side becomes negative. Therefore, the image processing apparatus in the first embodiment discards the sign patterns formed by selecting the negative sign as the sign before radical symbol in the right side of the equation representing distance $L_1$. If the angle θ between vector $V_o$ and vector $V_1$ in FIG. 1 is equal to or smaller than 90 degrees, for example, the value of the inner product in the right side of the equation that represents distance $L_2$ becomes negative. In this case, it is unclear whether the value of distance $L_2$ calculated when each symbol before the equation representing distance $L_2$ is selected is positive or negative, so whether the calculated value is appropriate as the value of distance $L_2$ cannot be determined. Accordingly, the image processing apparatus in the first embodiment leaves the sign patterns formed by selecting the positive sign and negative sign before the radical symbol in the right term representing distance $L_2$ without discarding them. As a result, the image processing apparatus in the first embodiment discards the two patters, (−, −), and (−, +) and leaves the two patterns (+, −), and (+, +).

As for the sign patterns that are left without being discarded, distance $L_1$ has only one candidate value calculated when the positive sign placed between the inner product term in the right side of the equation that represents distance $L_1$ and the radical symbol term therein is selected. That is, candidates of the value of distance $L_1$ in FIG. 1 are narrowed to one of the two candidates given by selecting the two types of signs. By contrast, distance $L_2$ has two candidate values, which are calculated when the positive sign placed between the inner product term in the right side of the equation that represents distance $L_2$ and the radical symbol term therein is selected and when the negative sign is selected. That is, the candidates of distance $L_2$ in FIG. 1 are two values; the value corresponding to $L_{2A}$ in FIG. 1 and the value corresponding to $L_{2B}$ in FIG. 1. The two candidates given by selecting the two types of signs are left. As described above, when the distances from the origin in the camera coordinate system to positions, in the camera coordinate system, corresponding to markers are calculated, if an angle formed between eye line vectors is considered, it may become possible to narrow two candidates given by two types of signs.

The image processing apparatus in the first embodiment then calculates error between a candidate value of a distance between markers in the three-dimensional space and the value of its corresponding actual distance between them, for the left sign patterns that are left without being discarded. For example, the image processing apparatus in the first embodiment calculates error for the sign patterns as described below.

First, the image processing program in the first embodiment obtains distances $L_1$ and $L_{2A}$ for, for example, the sign pattern (+, +), which is left without being discarded, according to distance $L_0$ and equations (2) above. The image processing program in the first embodiment also obtains distances $L_1$ and $L_{2B}$ for, for example, the sign pattern (+, −), which is left without being discarded, according to distance $L_0$ and equations (2) above. The value of distance $L_0$ is preset in a range of values that distance $L_0$ can take.

For the sign pattern (+, +), the image processing apparatus in the first embodiment calculates the candidate value between markers in the three-dimensional space, that is, the distance between point $P_1$ and point $P_{2A}$ in FIG. 1, according to distance $L_1$ and $L_{2A}$. For the sign pattern (+, −), the image processing apparatus in the first embodiment also calculates the candidate value between markers in the three-dimensional space, that is, the distance between point $P_1$ and point $P_{2B}$ in FIG. 1, according to distance $L_1$ and $P_{2B}$.

The image processing apparatus in the first embodiment then calculates error between the distance between point $P_1$ and point $P_{2A}$ calculated for the sign pattern (+, +) and its corresponding actual distance between the markers in the three-dimensional space. Similarly, the image processing apparatus in the first embodiment then calculates error between the distance between point $P_1$ and point $P_{2B}$ calculated for the sign pattern (+, −) and its corresponding actual distance between the markers in the three-dimensional space.

The image processing apparatus in the first embodiment then compares the error calculated for the sign pattern (+, +) with the error calculated for the sign pattern (+ −. If the error calculated for the sign pattern (+ +) is smaller, the image processing apparatus in the first embodiment determines distance $L_0$, distance $L_1$ and distance $L_{2A}$ as the distances from the origin of the camera coordinate system to the makers in the three-dimensional space.

In the process to calculate error for the above sign patterns, the image processing apparatus in the first example carries out a process to detect a distance to the reference point and a distance to a point other than the reference point when error between the distance between two selected points other than the reference point and its corresponding actual distance is minimized. For example, expression (3) below represents a process to detect a distance to the reference point and a distance to a point other than the reference point when error between the distance between corresponding point $P_1$ and corresponding point $P_2$ and its corresponding actual distance is minimized. $D_{1,2}$ in equation (3) corresponds to $D(1, 2)$ in FIG. 1. $L_2$ in equation (3) corresponds to $L_{2A}$, $L_{2B}$, or the like. $\|V\|$ indicates, for example, the length of a vector V. $|a|$ indicates, for example, the absolute value of real number "a".

[Equation 3]

$$\arg\min_{L_1, L_2} |\|L_1 v_1 - L_2 v_2\| - D_{1,2}| \qquad (3)$$

As described above, the image processing apparatus in the first embodiment first selects at most two types of signs for the sign patterns described above. For the non-selected sign patterns, the image processing apparatus in the first embodiment then detects a distance to the reference point and a distance to a point other than the reference point when error between the distance between two selected points other than the reference point and its corresponding actual distance is minimized. The image processing apparatus in the first embodiment thus quickly and precisely calculates the positions of the points, in the three-dimensional space, corresponding to points on an image plane on which at least four markers are projected.

Structure of the Image Processing Apparatus in the First Embodiment (First Embodiment)

Figure 2:
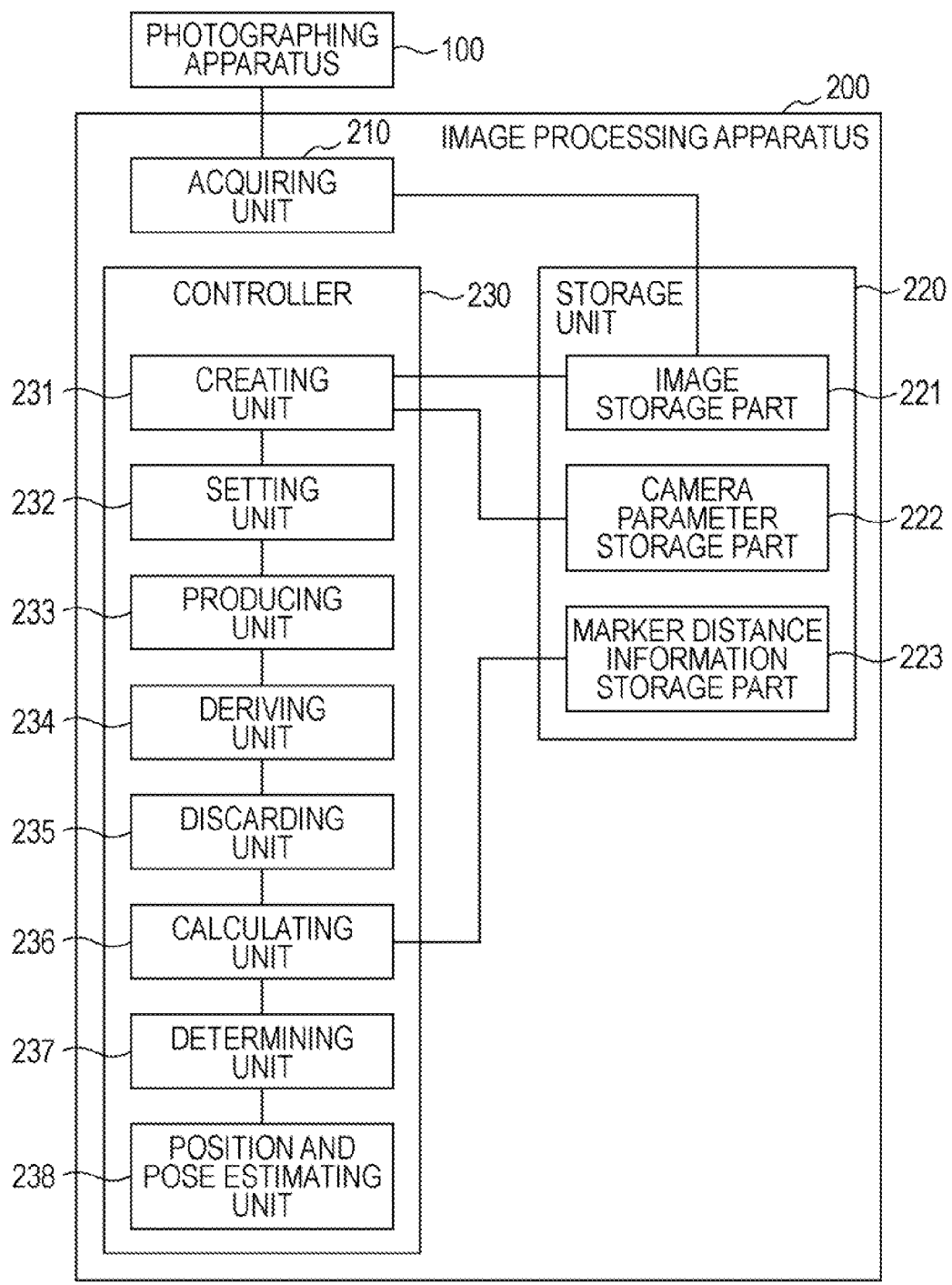
FIG. 2 is a functional block diagram of the image processing apparatus according to the first embodiment.

FIG. 2 is a functional block diagram of the image processing apparatus according to the first embodiment. FIG. 2 only depicts functional blocks that are necessary when the image processing apparatus in the first embodiment is described. In the description below, the origin of the camera coordinate system may be simply referred to as the origin C, and a three-dimensional position in the camera coordinate system may be simply referred to as a corresponding point.

Referring to FIG. 2, an image processing apparatus 200 in the first embodiment is connected to, for example, a photographing apparatus 100. The photographing apparatus 100 is a monocular camera or stereo camera, for example. The photographing apparatus 100 photographs four markers placed at predetermined positions in the actual space around, for example, a vehicle or robot. In the description below, the photographing apparatus 100 may be referred to as the camera.

The image processing apparatus 200 includes an acquiring unit 210, a storage unit 220, and a controller 230, as depicted in FIG. 2. The acquiring unit 210 acquires the images of markers photographed by the photographing apparatus 100. The acquiring unit 210 then stores the images of the markers, which have been acquired from the photographing apparatus 100, in an image storage part 221 provided in the acquiring unit 210.

In addition to the image storage part 221, the storage unit 220 includes a camera parameter storage part 222 and a marker distance information storage part 223, as depicted in FIG. 2. The storage unit 220 is a random access memory (RAM) or flash memory, for example.

The image storage part 221 stores the images of the markers, which have been acquired by the acquiring unit 210, for example. The camera parameter storage part 222 stores information about camera parameters that include information about the focal length and optical axis position of the camera, which is information about so-called intra-camera parameters. The intra-camera parameters are used when eye line vectors are created by a creating unit 231 described later. The marker distance information storage part 223 stores information about actual distances among markers, in the three-dimensional space, placed around a vehicle or robot. The storage unit 220 further includes an area in which a range in which the values of distance $L_n$ can be taken. The range in which the values of distance $L_n$ can be taken may be stored in the storage unit 220 in advance. Alternatively, the range may be a numerical range entered by the user and stored in the storage unit 220 when a process described later is carried out. The range of distance $L_n$ stored in the storage unit 220 is a range of values around a predicted value in an environment in which a camera installation position is predicted in advance. When, for example, a vehicle equipped with a camera is parked in a test site having markers and the position and pose of the camera are precisely calculated, a numerical range is estimated from the position in the test site at which the vehicle is parked, the camera installation position, specific to the vehicle type, used in design, and other information, and the estimated numerical range is stored.

Referring again to FIG. 2, the controller 230 includes the creating unit 231, a setting unit 232, a producing unit 233, a deriving unit 234, a discarding unit 235, a calculating unit 236, a determining unit 237, and a position and pose estimating unit 238. The controller 230 is an electronic circuit or integrated circuit, for example. Examples of the electric circuit include a central processing unit (CPU) and a microprocessing unit (MPU). Examples of the integrated circuit include an application specific integrated circuit (ASIC) and a field programmable gate array (FPGA).

The creating unit 231 creates eye line vectors corresponding to markers from the camera. For example, the creating unit 231 acquires an image of four markers from the image storage part 221 and also acquires the intra-camera parameters, including the information about the focal length, from the camera parameter storage part 222. The creating unit 231 then acquires information about the positions of the four markers on an image plane of the image of the four markers. The creating unit 231 then creates eye line vectors corresponding to the four markers from the camera, according to the intra-camera parameters and the information about the positions of the four markers on the marker image. For example, eye line vector $V_i$ (i=0, 1, 2, 3) can be given by equation (4) below in which K is a regular three-dimensional square matrix, which gives the intra-camera parameters, $x_i$ is a coordinate of the image, and $x'_i$ is a homogenous coordinate representation of $x_i$. In equation (4), the size of eye line vector $V_i$ is normalized to 1. $K^{-1}$ in equation (4) is an inverse matrix of the three-dimensional square matrix K.

[Equation 4]

$$v_i = \frac{K^{-1} x'_i}{\|K^{-1} x'_i\|} \qquad (4)$$

Virtual three-dimensional positions (corresponding positions), in the camera coordinate system, that correspond to the points on the image plane on which the four markers are projected can be represented by equation (5) below by using the eye line vectors created by the creating unit 231. Equation (5) indicates that the corresponding points are present on extension lines of the eye line vectors. In the description below, the virtual three-dimensional positions, in the camera coordinate system, that correspond to the points on the image plane on which the markers are projected may be simply referred to as the corresponding points. The corresponding points corresponding to the points on the image plane on which the four markers are projected can be obtained by using the results of processes executed by the setting unit 232, producing unit 233, deriving unit 234, discarding unit 235, calculating unit 236, and determining unit 237 described below. The creating unit 231 has information about a correspondence between the positions on the image plane on which the markers are projected and the positions of the markers in the three-dimensional space in advance.

[Equation 5]

$$P_i = L_i v_i \qquad (5)$$

Figure 3:
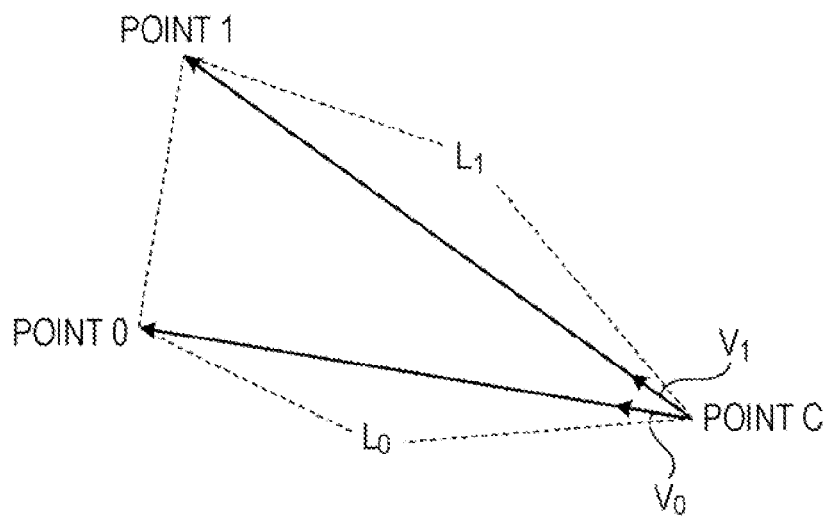
FIG. 3 is a drawing used to describe a creating unit in the first embodiment.

FIG. 3 illustrates an example of eye line vectors created by the creating unit 231. FIG. 3 is a drawing used to describe the creating unit in the first embodiment. As illustrated in FIG. 3, the creating unit 231 creates vector $V_0$ that corresponds to point 0, which is one of the corresponding points, starting from the origin C in the camera coordinate system, and also creates vector $V_1$ that corresponds to point 1, which is another one of the corresponding points, starting from the origin C in the camera coordinate system. Similarly, although not illustrated in FIG. 3, the creating unit 231 also creates vector $V_2$ that corresponds to point 2, which is another one of the corresponding points, starting from the origin C in the camera coordinate system, and vector $V_3$ that corresponds to point 3, which is the remaining corresponding point, starting from the origin C in the camera coordinate system.

Referring again to FIG. 2, the setting unit 232 selects a reference point M (any one of points 0 to 3), which corresponds to a marker used as a reference (the marker will be referred to below as the reference marker), from the four virtual corresponding points corresponding to the four markers projected on the image plane. The setting unit 232 also sets a prescribed value L as distance $L_0$ to the reference point M. The value of L set as distance $L_0$ is estimated from the position of the installed camera and the positions of the placed markers in advance.

Figure 4:
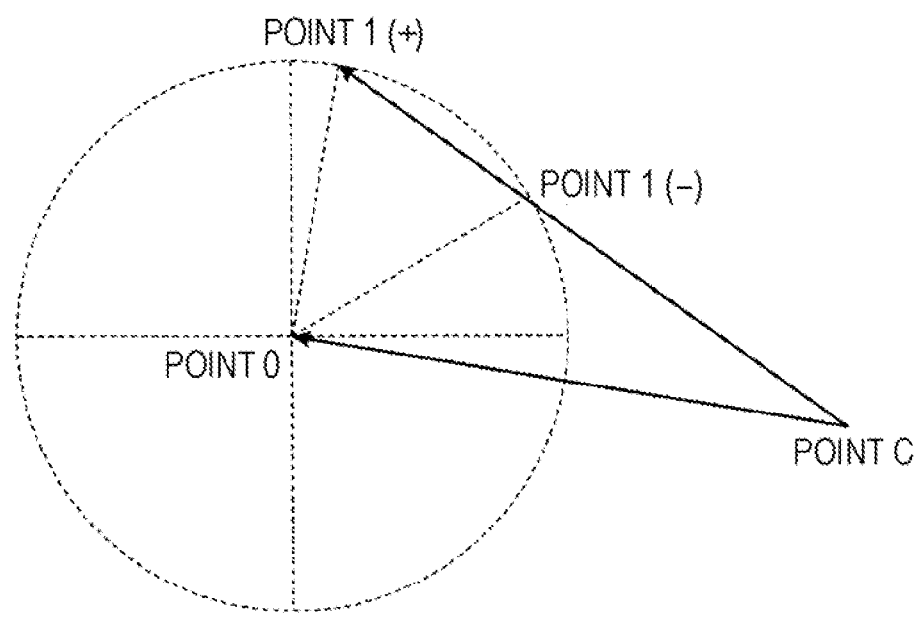
FIG. 4 is a drawing used to describe a generating unit in the first embodiment.

Referring to FIG. 2, the producing unit 233 produces equations that represent distances $L_1$, $L_2$ and $L_3$ to the points other than the reference point M, that is, points 1 to 3, which correspond to the markers other than the reference marker. Distances $L_1$, $L_2$ and $L_3$ can be formulated according to the cosine formula as in equation (2) described above. FIG. 4 illustrates an example of distances to the corresponding points, which are obtained from the equations produced by the producing unit 233. FIG. 4 is a drawing used to describe the generating unit in the first embodiment. Point 1 (+) in FIG. 4 is equivalent to a point to a distance calculated when the positive sign has been selected as the sign placed before the radical symbol in the equation representing distance $L_1$, and point 1 (−) in FIG. 4 is equivalent to a point to a distance calculated when the negative sign has been selected as the sign placed before the radical symbol in the equation representing distance $L_1$.

As illustrated in FIG. 4, when point 0 is selected as the reference point, equation (2) described above gives two candidates, a distance from the point C to point 1 (+) and a distance from the point C to point 1 (−), as a distance from the origin C in the camera coordinate system to point 1. That is, the number of candidates for the distance from the origin C in the camera coordinate system to point 1 can be limited to at most two by using the equations that represent distances $L_1$, $L_2$ and $L_3$ to points 1 to 3 corresponding to the markers other than the reference marker.

Referring again to FIG. 2, the deriving unit 234 derives all sign patterns used by the reference marker set by the setting unit 232. FIG. 5 illustrates sign patterns derived when point 0 of points 0 to 3 is used as the reference point. FIG. 5 is a drawing used to describe a deriving unit in the first embodiment. As illustrated in FIG. 5, the deriving unit 234 derives eight sign patterns, (+, +, +), (+, +, −), (+, −, +), (+, −, −), (−, +, +), (−, +, −), (−, −, +), and (−, −, −).

The deriving unit 234 also calculates the value in the radical symbol in each equation produced by the producing unit 233, and determines whether all values in the radical symbols in the equations are real numbers. If all values in the radical symbols have been determined to be real numbers, then the deriving unit 234 sends the sign patterns to the discarding unit 235. If all values in the radical symbols have not been determined to be real numbers, then the deriving unit 234 sends a notification of terminating the process to the determining unit 237 described later. Although, in this embodiment, the deriving unit 234 has determined whether all values in the radical symbols in the equations are real numbers, this is not a limitation; the producing unit 233, for example, may determine all values in the radical symbols in the equations are real numbers.

Out of the sign patterns derived by the deriving unit 234, the discarding unit 235 discards sign patterns that prevents at least one of distances $L_1$, $L_2$ and $L_3$ from taking an appropriate value. First, the discarding unit 235 selects one corresponding point N other than the reference point M. When point 0 has been selected as the reference point M, for example, the discarding unit 235 selects any one of points 1 to 3 as the corresponding point N. The discarding unit 235 then acquires, from the creating unit 231, the eye line vector extending from the origin C to the reference point M and the eye line vector extending from the origin C to the corresponding point N.

The discarding unit 235 then calculates the inner product of the eye line vector corresponding to the reference point M and the eye line vector corresponding to the selected corresponding point N, and determines whether the angle formed by these eye line vectors is larger than 90 degrees. If the value of the calculated inner product is negative, for example, the discarding unit 235 determines that the angle formed by the eye line vectors is larger than 90 degrees. If it is determined that the angle formed by the eye line vectors is larger than 90 degrees, the discarding unit 235 records that only the positive sign is eligible for the selected corresponding point N. The recording means that the discarding unit 235 stores, in the internal storage unit, data indicating that only the positive sign is eligible for the selected corresponding point N.

If it is determined that the angle formed by the eye line vectors is equal to or smaller than 90 degrees, the discarding unit 235 records that both the positive sign and the negative sign are eligible for the selected corresponding point N. The recording means that the discarding unit 235 stores, in the internal storage unit, data indicating that both the positive sign and the negative sign are eligible for the selected corresponding point N. The discarding unit 235 carries out the same process for all other points that have not been selected, and determines the sign patterns by listing sign combinations that can be taken by all corresponding points.

An example of determining sign patterns will be described with reference to FIG. 6. FIG. 6 conceptually illustrates a process executed by the discarding unit in the first embodiment. The discarding unit 235 selects point 1 from points 1 to 3 other than reference point 0 in FIG. 6. The discarding unit 235 then acquires eye line vector $V_0$ corresponding to point 0 and eye line vector $V_1$ corresponding to point 1 from the creating unit 231. The discarding unit 235 then calculates the inner product of eye line vector $V_0$ and eye line vector $V_1$, and determines whether the angle formed by eye line vector $V_0$ and eye line vector $V_1$, is larger than 90 degrees. If it is determined that the angle formed by eye line vector $V_0$ and eye line vector $V_1$, is larger than 90 degrees, the discarding unit 235 records that only the positive sign is eligible for selected point 1. If it is determined that the angle formed by these eye line vectors is equal to or smaller than 90 degrees, the discarding unit 235 records that both the positive sign and the negative sign are eligible for selected point 1.

The discarding unit 235 selects remaining points 2 and 3 from points 1 to 3, which are corresponding points, carries out the same process as described above for the selected points, and determines sign patterns by listing sign combinations that can be taken by points 1 to 3. For example, the discarding unit 235 lists sign combinations that can be taken by points 1 to 3. As the result, the discarding unit 235 discards (−, +, +), (−, +, −), (−, −, +), and (−, −, −) out of the sign patterns depicted in FIG. 6, and leave (+, +, +), (+, +, −), (+, −, +), and (+, −, −) as the sign combinations that can be taken by points 1 to 3. The discarding unit 235 thus determines the four sign patterns (+, +, +), (+, +, −), (+, −, +), and (+, −, −), depicted in FIG. 6, which are left without being discarded, as the sign patterns that can be taken by points 1 to 3.

Referring again to FIG. 2, the calculating unit 236 calculates error between a candidate value of the distance between each two corresponding points other than the reference point and its corresponding actual distance in the three-dimensional space for each sign pattern determined by the discarding unit 235, and calculates minimum error for each sign pattern.

The calculating unit 236 first initializes the value of minimum error J, which is used later. The calculating unit 236 selects one sign pattern from the sign patterns determined by the discarding unit 235, and calculates the values of distances $L_1$, $L_2$ and $L_3$ for the selected sign pattern. The calculating unit 236 uses the value L of distance $L_0$, to reference point 0 set by the setting unit 232 and the equations produced by the producing unit 233 to calculate the values of distances $L_1$, $L_2$ and $L_3$.

Next, the calculating unit 236 determines whether the values of distances $L_1$, $L_2$ and $L_3$ are positive real numbers. Positive real numbers mean numbers having positive values of real numbers. If it is determined that distances $L_1$, $L_2$ and $L_3$ are not positive real numbers, the calculating unit 236 selects a next sign pattern. If it is determined that distances $L_1$, $L_2$ and $L_3$ are positive real numbers, the calculating unit 236 initializes the value of error E to, for example, 0. The value of error E is obtained by adding the value of error calculated for a combination of two points other than reference point 0 when a prescribed condition is met, as will be described later.

Next, the calculating unit 236 acquires one combination of two points other than reference point 0 within the selected sign pattern. The calculating unit 236 then calculates a candidate value of the distance between the two points for the acquired combination of the two points. The calculating unit 236 acquires, from the marker distance information storage part 223, the value of the actual distance between markers, in the three-dimensional space, corresponding to the calculated candidate value, and calculates error between the candidate value and the actual distance value. The calculating unit 236 adds the calculated error to the value of the error E to update it, and determines whether the updated value of the error E is larger than the value of the minimum error J. If the updated value of the error E is larger than the value of the minimum error J, the calculating unit 236 selects a next sign pattern out of the sign patterns determined by the discarding unit 235.

If it is determined that the value of the error E is equal to or smaller than the value of the minimum error J, the calculating unit 236 determines whether all combinations of two points other than reference point 0 in the selected sign pattern have been processed. If it is determined that all combinations of two points other than reference point 0 in the selected sign pattern have been processed, the calculating unit 236 updates the value of the minimum error J with the value of the error E and selects a next sign pattern from the sign patterns determined by the discarding unit 235. If it is determined that all combinations of two points other than reference point 0 in the selected sign pattern have not been processed, the calculating unit 236 selects a next combination from the combinations of two points other than reference point 0. The calculating unit 236 then carries out the same process as described above for all acquired combinations of two points.

When completing the process for all sign patterns, the calculating unit 236 sends, to the determining unit 237, processing results related to that the reference point is point 0 and distance $L_0$ is L. For example, the calculating unit 236 sends the value of the last error E, that is, the value of the minimum error in the sign pattern as well as the values of $L_0$, $L_1$, $L_2$, and $L_3$ in the sign pattern corresponding to the minimum error, as the processing results.

Processes executed by the calculating unit 236 in the first embodiment will be conceptually described with reference to FIGS. 7 to 10. The processes in FIGS. 7 to 10 are executed after the value of the error E has been initialized. FIGS. 7 to 10 conceptually illustrate processes executed by the calculating unit in the first embodiment.

The calculating unit 236 first selects, for example, the sign pattern (+, +, +) from the sign patterns (+, +, +), (+, +, −), (+, −, +), and (+, −, −) in FIG. 7. The calculating unit 236 then acquires a combination (point 1, point 2) of two points other than reference point 0 within the selected sign pattern (+, +, +). The calculating unit 236 then calculates a candidate value of the distance between the two points for the combination (point 1, point 2) of the two points. The calculating unit 236 then acquires, from the marker distance information storage part 223, the value of the actual distance, corresponding to the calculated candidate value, between markers in the three-dimensional space, and calculates error between the candidate value and its corresponding actual distance value. Then, the calculating unit 236 adds the value of the calculated error to the value of the error E to update it, and determines whether the updated value of the error E is larger than the value of the minimum error J. If it is determined that the updated value of the error E is equal to or smaller than the value of the minimum error J, the calculating unit 236 determines whether all combinations of two points other than reference point 0, which are (point 1, point 2), (point 1, point 3), and (point 2, point 3), within the sign pattern sign pattern (+, +, +) have been processed.

If it is determined that all combinations of two points other than reference point 0 have not been processed, the calculating unit 236 acquires a combination of two points other than reference point 0, which is (point 1, point 3), for example, within the same sign pattern (+, +, +). For the combination (point 1, point 3) of two points, the calculating unit 236 then carries out the same process as executed for the combination (point 1, point 2) of two points other than reference point 0. That is, the calculating unit 236 calculates a candidate value of the distance between the two points for the combination (point 1, point 3) of the two points, acquires the value of the actual distance, in the three-dimensional space, corresponding to the calculated candidate value, and calculates error between the candidate value and the actual distance value. Then, the calculating unit 236 adds the value of the calculated error to the value of the error E to update it, and determines whether the updated value of the error E is larger than the value of the minimum error J. If it is determined that the updated value of the error E is equal to or smaller than the value of the minimum error J, the calculating unit 236 adds the value of the error E to the value of the minimum error J to update it, and determines again whether all combinations of two points other than reference point 0 within the sign pattern sign pattern (+, +, +) have been processed.

Since the calculating unit 236 has set the value of the minimum error J to an infinite value for the first selected sign pattern (+, +, +), processes for all combinations of two points other than reference point 0 are always completed. As illustrated in FIG. 7, therefore, E000 is obtained as the value of the error E for the sign pattern (+, +, +). The value E000 of the error E is equivalent to the sum of the value of error for a combination (point 1, point 2) of two points, the value of error for a combination (point 1, point 3) of two points, and the value of error for a combination (point 2, point 3) of two points. The value E000 of the error E is used as the value of the minimum error J in processes for other sign patterns, which are executed after the process for the sign pattern (+, +, +). If processes are executed by the procedure described above, therefore, the minimum value of the values of error calculated for all sign patterns can be obtained.

Now, a case in which processes for all combinations of two points other than reference point 0 have been completed within the sign pattern (+, +, +) will be described, the case differing from the above result of determination as to whether all combinations of two points other than reference point 0 have been completed. When all combinations of two points other than reference point 0 have been processed, the calculating unit 236 updates the value of the minimum error J with the value of the error E. The calculating unit 236 then selects a next sign pattern, for example, (+, +, −) from the sign patterns in FIG. 7. For the sign pattern (+, +, −), the calculating unit 236 then carries out the same process as executed for the sign pattern (+, +, +).

Now, a case in which the value of the error E is larger than the value of the minimum error J will be described, the case differing from the above result of determination as to whether the value of the error E is larger than the value of the minimum error J. When the value of the error E is larger than the value of the minimum error J, the calculating unit 236 cancels the process for the currently selected sign pattern, and selects a next sign pattern from the sign patterns in FIG. 7. For the selected sign pattern, the calculating unit 236 then carries out the same process as executed for the sign pattern (+, +, +) that has been described above.

If a determination result in the process of the sign pattern (+, +, −) is that the value of the error E is larger than the value of the minimum error J, for example, the calculating unit 236 cancels the process for the sign pattern (+, +, −) and selects a next non-selected sign pattern, which is (+, −, −), for example. The calculating unit 236 then acquires a combination (point 1, point 2) of two points other than reference point 0 within the sign pattern (+, −, −). Then the calculating unit 236 calculates a candidate value of the distance between the two points for the combination (point 1, point 2) of the two points, acquires the value of the actual distance, in the three-dimensional space, corresponding to the calculated candidate value, and calculates error between the candidate value and the actual distance value. Then, the calculating unit 236 adds the value of the calculated error to the value of the error E to update it, and determines whether the updated value of the error E is larger than the value of the minimum error J. If it is determined that the updated value of the error E is equal to or smaller than the value of the minimum error J, the calculating unit 236 determines whether all combinations of two points other than reference point 0 within the sign pattern sign pattern (+, −, −) have been processed. The calculating unit 236 then carries out the same process as described above. If the value of the error E is larger than the value of the minimum error J, the calculating unit 236 adds the value of the error E to the value of the minimum error J to update it, and determines again whether all combinations of two points other than reference point 0 in the sign pattern sign pattern (+, −, −) have been processed. After that, the calculating unit 236 carries out the same process as described above.

When completing calculation for all sign patterns in FIG. 7 by the procedure described above, the calculating unit 236 obtains the value of the minimum error min(E000 to E003) out of errors E000, E001, E002, and E003, as illustrated in FIG. 8. The calculating unit 236 then sends, to the determining unit 237 described later, the value of the minimum error min(E000 to E003) and the values of $L_0$, $L_1$, $L_2$, and $L_3$ corresponding to it as the processing results, in relation to the reference point set to point 0 and distance $L_0$ set to L.

If the setting unit 232 sets L+ΔL, rather than L, as the value of the distance to reference point 0 as illustrated in FIG. 9, the calculating unit 236 executes processes by the procedure described so far, in relation to the reference point set to point 0 and distance $L_0$ set to L+ΔL. The calculating unit 236 then outputs, to the determining unit 237 described later, the value of the minimum error min(E010 to E013) and the values of $L_0$, $L_1$, $L_2$, and $L_3$ corresponding to it as the processing results, in relation to the reference point set to point 0 and distance $L_0$ set to L+ΔL.

If the setting unit 232 sets point 1, rather than point 0, as the new reference point as illustrated in FIG. 10, the calculating unit 236 executes processes by the procedure described so far, in relation to the reference point set to point 1 and distance $L_0$ set to L'. The calculating unit 236 then outputs the value of the minimum error min(E020 to E02v, v is a natural number) and the values of $L_0$, $L_1$, $L_2$, and $L_3$ corresponding to it as the processing results, in relation to the reference point set to point 1 and distance $L_0$ set to L'. Although not illustrated in FIG. 10, if the setting unit 232 sets L'+ΔL', rather than L', as the value of the distance to the reference point 1, the calculating unit 236 executes processes by the procedure described so far, in relation to the reference point set to point 1 and distance $L_0$ set to L'+ΔL'. The calculating unit 236 then outputs, to the determining unit 237 described later, the value of the minimum error and the values of $L_0$, $L_1$, $L_2$, and $L_3$ corresponding to it as the processing results, in relation to the reference point set to point 1 and distance $L_0$ set to L'+ΔL'.

The calculating unit 236 has been described for cases in which the value of the minimum error out of the values of errors in different sign patterns for the reference point and the distance to the reference point is calculated for different settings of the distance to the reference point, but this is not a limitation. For example, the calculating unit 236 may continue to update the minimum error J, instead of initializing it, within processes for the same reference point, and may calculate the minimum error having the smallest value in all sign patterns within the processes for the same reference point. Alternatively, the calculating unit 236 may continue to update the minimum error J, instead of initializing it, within processes for all reference points, and may calculate the value of the minimum error in all sign patterns within the processes for the all reference points.

Referring again to FIG. 2, the determining unit 237 determines a distance from the origin of the camera coordinate system to a corresponding point, in the three-dimensional space, corresponding to a point on the image plane on which at least four marker are projected, from the processing result received from the calculating unit 236.

When the determining unit 237 acquires the value of the minimum error and the values of $L_0$, $L_1$, $L_2$, and $L_3$ corresponding to it from the calculating unit 236 as the processing results, for example, the determining unit 237 stores the acquired processing results. Then, the determining unit 237 determines whether the process has been completed by setting all values that can be taken as the distance to the reference point. If reference point 0 is selected at present, for example, the determining unit 237 determines whether the process has been completed by setting all values that can be taken as distance $L_0$ to the reference point. If it is determined that the process has not been completed by setting all values that can be taken as distance $L_0$, the determining unit 237 asks the setting unit 232 to set a value, other than the value of L, as the value of $L_0$.

If it is determined that the process has been completed by setting all values that can be taken as distance $L_0$, the determining unit 237 determines whether processes have been completed by using all of points 0 to 3, which are corresponding points, as the reference point. If reference point 0 is selected at present, for example, the determining unit 237 determines whether processes have been completed by using the remaining corresponding points, points 1 to 3, as the reference point. If it is determined that processes have not been completed by using all of points 0 to 3, which are corresponding points, as the reference point, the determining unit 237 asks the setting unit 232 to set a new reference point and a new distance.

If it is determined that processes have been completed by using all of points 0 to 3, which are corresponding points, as the reference point, the determining unit 237 locates the minimum error having the smallest value out of the processing results that have been acquired from the calculating unit 236 and stored. For example, the determining unit 237 locates the minimum error having the smallest value out of minimum errors min(E000 to E003), min(E010 to E013), min(E020 to E02v, v is a natural number), etc. illustrated in FIG. 10. The determining unit 237 then determines the values of $L_0$, $L_1$, $L_2$, and $L_3$ corresponding to the located minimum error as the optimum solutions and sends them to the position and pose estimating unit 238.

Figure 11:
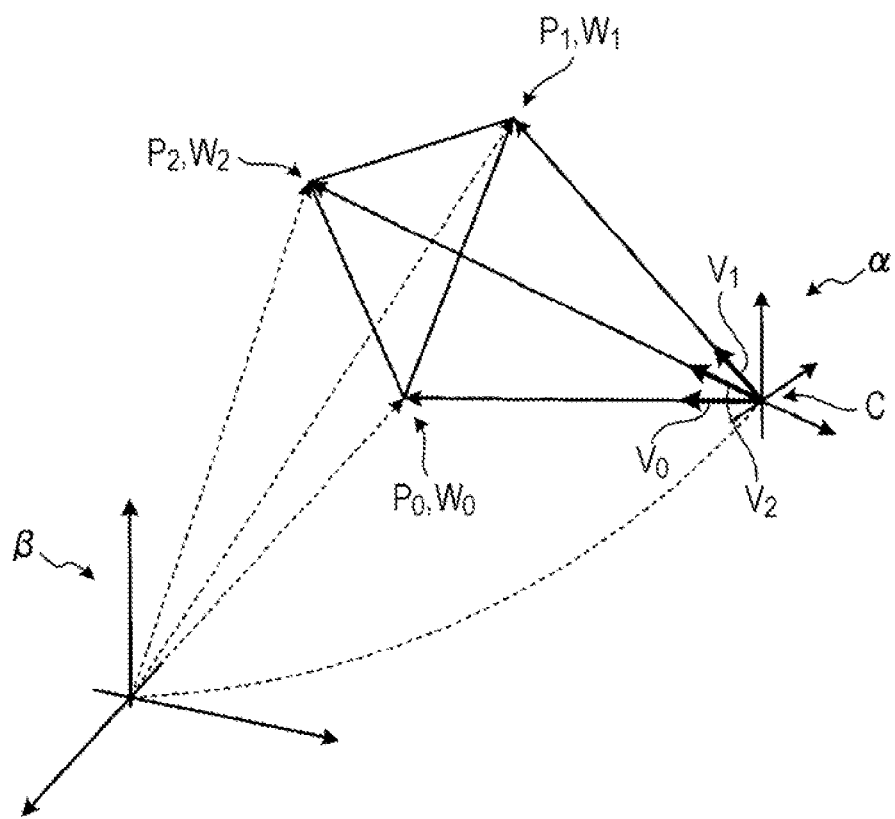
FIG. 11 is a drawing used to describe a position and pose estimating unit in the first embodiment.

Referring again to FIG. 2, the position and pose estimating unit 238 uses the values of $L_0$, $L_1$, $L_2$, and $L_3$ acquired from the determining unit 237 as the optimum solutions to calculate the three-dimensional positions, in the camera coordinate system, corresponding to the points on the image plane, and uses the calculated values to calculate the position and pose of the camera. The position and pose estimating unit 238 in the first embodiment will be described with reference to FIG. 11. FIG. 11 is a drawing used to describe the position and pose estimating unit in the first embodiment. In FIG. 11, the camera coordinate system is denoted a and the world coordinate system is denoted β. The three-dimensional positions of makers in the world coordinate system in FIG. 11 are denoted $W_0$, $W_1$, and $W_2$; $W_0$ corresponds to point 0, $W_1$ corresponds to point 1, and $W_2$ corresponds to point 2. Technology itself that calculates the position and pose of a camera is known, as described in, for example, Toru Tamaki et al. "Pose Estimation and Rotation Matrices" (IEICE (the Institute of Electronics, Information, and Communication Engineers) technical report, vol. 109, No. 203, SIS2009-23, September, 2009, pp. 59-64). Although the example described below focuses on three corresponding points (points 0, 1, and 2) as points corresponding to points on the image plane on which markers are projected to simplify the description, even if the number of corresponding points is four, they can be processed in the same way.

For example, the position and pose estimating unit 238 uses $L_0$, $L_1$, and $L_2$ acquired as the optimum solutions from the determining unit 237 and equation (5) described above to calculate corresponding points $P_0$, $P_1$ and $P_2$, in the camera coordinate system, corresponding to points on the image plane. The position and pose estimating unit 238 then calculates the position and pose of the camera by using a known technology, on the basis of the three-dimensional positions ($P_0$, $P_1$ and $P_2$) in the camera coordinate system and their corresponding marker positions ($W_0$, $W_1$ and $W_2$) in the world coordinate system.

Process Executed by the Image Processing Apparatus (First Embodiment)

Figure 12:
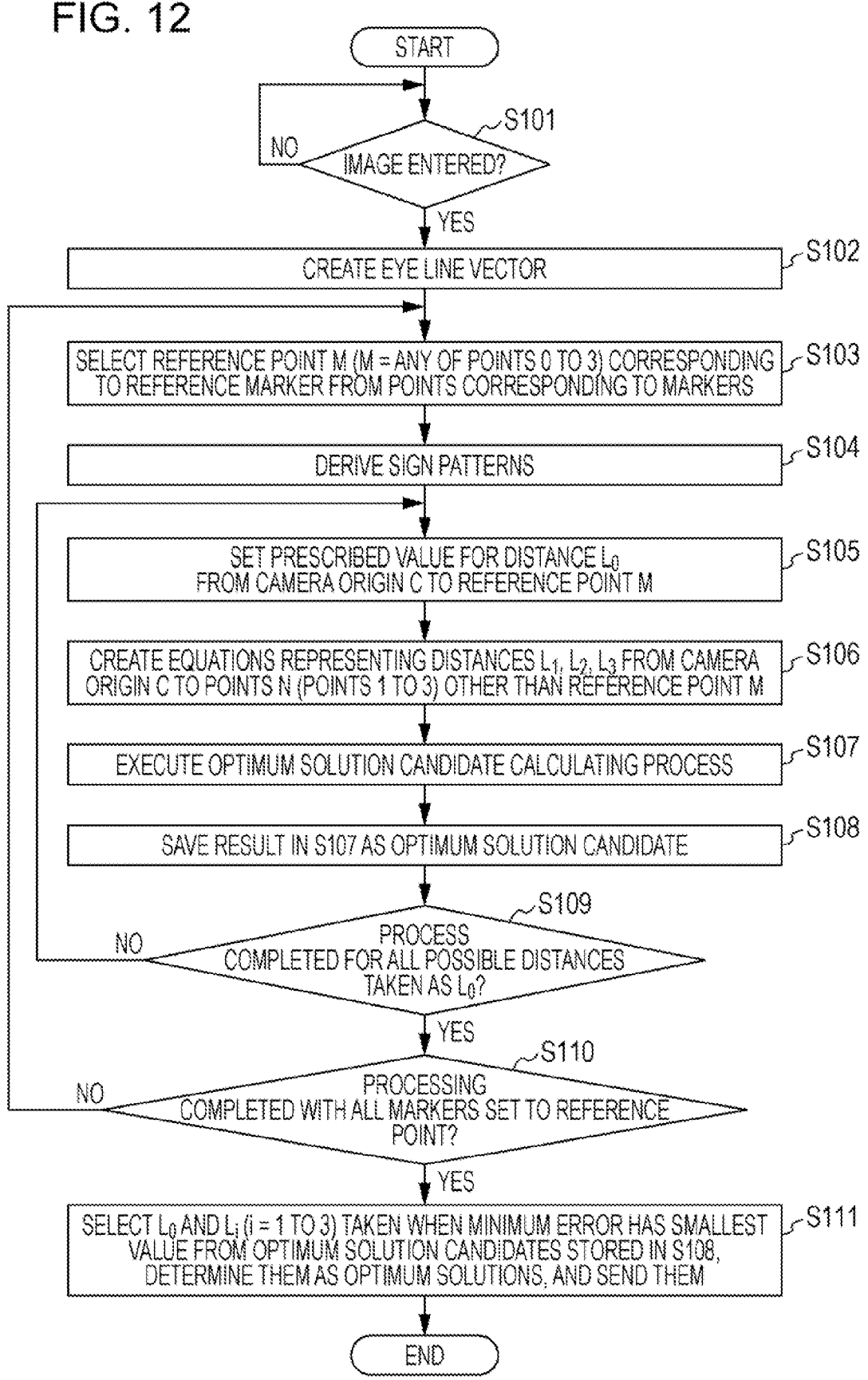
FIG. 12 illustrates a flow of an optimum solution calculating process in the first embodiment.

Next, the flows of processes executed by the image processing apparatus in the first embodiment will be described with reference to FIGS. 12 to 14. The flowchart in FIG. 12 illustrates a flow of an optimum solution calculating process in the first embodiment. The process in FIG. 12 is executed each time an image frame is acquired.

If, for example, the controller 230 detects image acquisition by the acquiring unit 210 as illustrated in FIG. 12 (the result in step S101 is Yes), the creating unit 231 generates an eye line vector (step S102). If image acquisition by the acquiring unit 210 is not detected (the result in step S101 is No), the controller 230 repeatedly determines whether an image has been acquired by the acquiring unit 210.

The setting unit 232 then selects the reference point M (any one of points 0 to 3) corresponding to the reference marker from the points corresponding to the markers (step S103). The deriving unit 234 derives all sign patterns used by the reference marker set by the setting unit 232 (step S104). The setting unit 232 sets a prescribed value for distance $L_0$ from the origin C in the camera coordinate system to the reference point M (step S105). The producing unit 233 then creates equations that represents distances $L_1$, L, and $L_3$ from the origin C in the camera coordinate system to the points (points 1 to 3) other than the reference point M (step S106). The sequence to be executed by the image processing apparatus 200 is transferred to the optimum solution candidate calculating process (step S107). The optimum solution candidate calculating process is executed mainly by the calculating unit 236. The optimum solution candidate calculating process will be described later with reference to FIG. 13.

Upon the acquisition of a result of the optimum solution candidate calculating process executed in step S107, the determining unit 237 stores the acquired result (step S108). The determining unit 237 then determines whether the process has been completed by setting all values that can be taken as $L_0$ to the reference point M (step S109).

If it is determined that the process has not been completed by setting all values that can be taken as distance $L_0$ (the result in step S109 is No), the determining unit 237 asks the setting unit 232 to set a value, other than the value of L, as the value of $L_0$. The sequence in FIG. 12 is then returned to step S105 described above.

If it is determined that the process has been completed by setting all values that can be taken as distance $L_0$ (the result in step S109 is Yes), the determining unit 237 determines whether processes have been completed by using all of points 0 to 3 as the reference point (step S110). If it is determined that all of points 0 to 3 have not been set as the reference point (the result in step S110 is No), the determining unit 237 returns the sequence to step S103 described above.

If it is determined that processes have been completed by using all of points 0 to 3 as the reference point (the result in step S110 is Yes), the determining unit 237 locates the minimum error having the smallest value out of the minimum errors stored in step S107 and determines the values of $L_0$ and $L_i$, (i=1 to 3) corresponding to the minimum error as the optimum solutions and sends them to the position and pose estimating unit 238 (step S111). This completes the optimum solution calculating process in the first embodiment. The sequence of the optimum solution candidate process illustrated in FIG. 12 may be changed if there is no conflict in the process.

The distance L to the reference point is optimized by the determination results in steps S109 and S110 above. The process in FIG. 12 can be represented by equation (6) below. In equation (6), $i_0$ indicates the reference point and $L_{i0}$ indicates the distance to the reference point.

[Equation 6]

$$\min_{i_0, L_{i0}} J(i_0, L_{i0}) \quad (6)$$

Next, the flow of the optimum solution candidate calculating process in the first embodiment will be described with reference to FIG. 13. FIG. 13 illustrates a flow of an optimum solution candidate calculating process in the first embodiment. As illustrated in FIG. 13, the deriving unit 234 calculates the values of the radical symbols in all equations in step S106 in FIG. 12 and determines whether the value of each radical symbol is a real number (step S201). If it is determined that the value of a radical symbol is not a real number (the result in step S201 is No), the deriving unit 234 returns the sequence to step S109 in FIG. 12.

If the deriving unit 234 determines that all radical symbols have a real number (the result in step S201 is Yes), the sequence to be executed by the image processing apparatus 200 is transferred to the sign pattern determining process (step S202). The sign pattern determining process is executed by the discarding unit 235. The sign pattern determining process will be described with reference to FIG. 14.

The calculating unit 236 initializes the value of the minimum error J, which will be used later (step S203), and executes step S204 to S215 below for each sign pattern obtained from the sign pattern determining process indicated in step S203. Steps 204 to S215 are repeated until steps S205 to S214 are completed for all sign patterns. The calculating unit 236 selects one sign pattern (step S204), and calculates the values of distances $L_1$, $L_2$, and $L_3$ for the selected sign pattern (step S205). The calculating unit 236 then determines whether the values of the distances $L_1$, $L_2$, and $L_3$ are positive real numbers (step S206). If it is determined that any one of the values of the distances $L_1$, $L_2$, and $L_3$ is not a real number (the result in step S206 is No), the calculating unit 236 selects a next sign pattern. By contrast, if it is determined that the values of the distances $L_1$, $L_2$, and $L_3$ are all positive real numbers (the result in step S206 is Yes), the calculating unit 236 initializes the value of the error E (E=0) (step S207).

The calculating unit 236 then acquires one combination of two points (two out of points 1 to 3) other than the reference point M in the pattern selected in Step S204 (step S208). The calculating unit 236 calculates a candidate value for the distance between the two points of the two-point combination acquired in step S208 (step S209). The calculating unit 236 acquires the value of the actual distance between the markers, in the three-dimensional space, corresponding to the calculated candidate value from the marker distance information storage part 223, and calculates error between the candidate value and the value of the actual distance corresponding to the candidate value (step S210). The calculating unit 236 adds the calculated value of the error to the value of the error E to update the error E (step S211), and determines whether the value of the E is larger than the value of the minimum error J (step S212).

If it is determined that the value of the error E is equal to or smaller than the value of the minimum error J (the result in step S212 is No), the calculating unit 236 determines whether all combinations of two points other than reference point 0 in the selected sign pattern have been processed (step S213). If it is determined that all combinations of two points other than reference point 0 in the selected sign pattern have been processed (the result in step S213 is Yes), the calculating unit 236 updates the value of the minimum error J with the value of the error E (step S214). The calculating unit 236 returns the sequence to step S202 above until steps S205 to S214 have been processed for all sign patterns obtained from the sign pattern determining process indicated in step S202 (step 215).

If, in step S213, all combinations of two points other than reference point 0 in the selected sign pattern have not been processed (the result in step S213 is No), the calculating unit 236 returns the sequence to step S208 above.

If, in step S212, the value of the error E is larger than the value of the minimum error J (the result in step S212 is Yes), the calculating unit 236 returns the sequence to step S202 above until steps S205 to S214 have been processed for all sign patterns obtained from the sign pattern determining process indicated in step S202 (step 215).

When steps S204 to S215 have been processed, the calculating unit 236 proceeds to the next step S216, where the calculating unit 236 sends the value of the last error E, that is, the value of the minimum error in the sign pattern as well as the values of $L_o$, $L_1$, $L_2$, and $L_3$ in the sign pattern corresponding to the minimum error as the processing results related to the reference point M, which is any one of points 0 to 3 (step S216). This completes the optimum solution candidate calculating process in the first embodiment. The sequence in which the optimum solution candidate calculating process illustrated in FIG. 13 may be changed if there is no conflict in the process.

The value of the actual distance between markers used in step S210 above can be represented by equation (7) below.

[Equation 7]

$$D_{i,j} = \|W_i - W_j\| \quad (7)$$

The values of distances $L_1$, $L_2$, and $L_3$ calculated in step S205 above can be given by equation (8) below.

[Equation 8]

$$L_1 = \langle v_i, v_{i0} \rangle L_{i0} + S_i \sqrt{D_{i,i0}^2 - L_{i0}^2(1 - \langle v_i, v_{i0} \rangle^2)} \quad (8)$$

The value of the error calculated in step S210 above can be given by equation (9) below.

[Equation 9]

$$e_{i,j} = |\|P_i - P_j\| - D_{i,j}| = |\|L_i v_i - L_j v_j\| - D_{i,j}| \quad (9)$$

The process in step S211 above can be represented by equation (10) below.

[Equation 10]

$$E(s \mid i_0, L_{i_0}) = \sum_{i,j \neq i_0} e_{i,j} \quad (10)$$

$$s = \{s_i \mid s_i = +1, \text{ or } -1, i \neq i_0\}$$

Next, the flow of the sign pattern determination process in the first embodiment will be described with reference to FIG. 14. FIG. 14 illustrates a flow of a sign pattern determination process in the first embodiment. As illustrated in FIG. 14, the sign pattern determination process repeats steps S301 to S305 for all corresponding points N (points 1 to 3) other than the reference point M.

First, the discarding unit 235 acquires one of points M (any one of points 1 to 3) other than the reference point M (step S301), and determines whether ∠MCN is greater than 90 degrees (step S302). ∠MCN is an angle formed by a line mutually connecting the origin C and the reference point N and a line mutually connecting the origin C and corresponding point N. Whether ∠MCN is greater than 90 degrees is determined according to the inner product of the eye line vector on the line mutually connecting the origin C and the reference point M and the eye line vector on the line mutually connecting the origin C and corresponding point N as described above.

If ∠MCN is greater than 90 degrees (the result in step S302 is Yes), the discarding unit 235 records that only the positive sign can be acquired at the selected one corresponding point N (step S303). If ∠MCN is equal to or less than 90 degrees (the result in step S302 is No), the discarding unit 235 records that both the positive sign and the negative sign can be acquired at the selected one corresponding point N (step S304).

Upon completion of the execution of steps S301 to S305 for all corresponding points N other than the reference point M, the discarding unit 235 lists sign combinations that can be taken by the corresponding point N and determines a sign patterns (step S306). This completes the sign pattern determination process in the first embodiment.

The processes in FIGS. 12 to 14 can be represented by equation (11) below. In equation (11), J in the left side is J in equation (6) above, that is, an error evaluation function that obtains $L_i$ by selecting a sign. The solution obtained from equation (11) is error that is left when the distance $L_i$, which is a distance to point i other than the reference point $i_0$ when a distance to the reference point i0 is denoted $L_{i0}$, is optimally selected by selecting a sign. Accordingly, equation (11) represents that when an optimum solution that minimizes J is found, the optimum distance $L_{i0}$ to the reference point $i_0$ and the optimum distance $L_i$ to point i other than the reference point $i_0$ can be obtained at the same time.

[Equation 11]

$$J(i_0, L_{i_0}) = \min_s E(s \mid i_0, L_{i_0}) \quad (11)$$

Effects in the First Embodiment

As described above, the image processing apparatus 200 in the first embodiment discards derived sign patterns that prevent at least one of distances $L_1$, $L_2$, and $L_3$ from taking an appropriate value. Accordingly, the image processing apparatus 200 in the first embodiment can quickly and precisely obtain the positions of the corresponding points, in the three-dimensional space, corresponding to points on an image plane on which at least four markers are projected. As a result, in the first embodiment, information about the position and pose of a camera can be quickly and precisely obtained. When only three markers are used, more than one optimum solution, which is a combination of solutions that give minimum error, is obtained. To cope with this, in the first embodiment described so far, the image processing apparatus carries out the optimum solution calculating process by using at least four markers. In the first embodiment, therefore, the optimum solution can be obtained.

Figure 13:
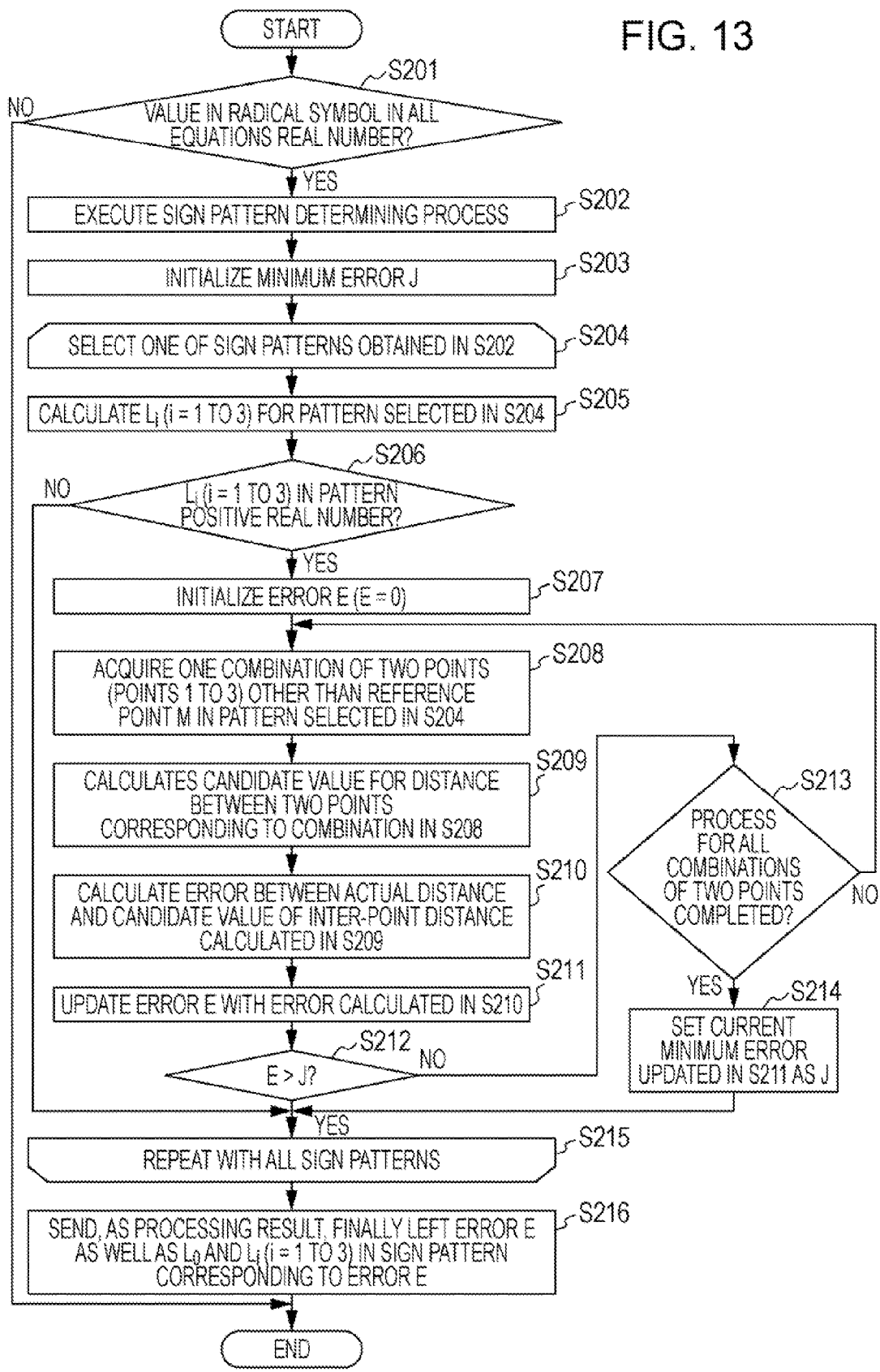
FIG. 13 illustrates a flow of an optimum solution candidate calculating process in the first embodiment.

During the calculation of sign pattern error as illustrated in, for example, FIG. 13, the image processing apparatus in the first embodiment cancels the process for a sign pattern that has error larger than the minimum error of the sign pattern errors calculated before, and processes a next sign pattern. Accordingly, in the first embodiment, the corresponding positions, in the three-dimensional space, corresponding to the points on the image plane on which at least four markers are projected can be more quickly calculated. As a result, in the first embodiment, information about the position and posture of a camera can be more quickly obtained.

An imaginary number may be included in a radical symbol in the equations that represent the distances $L_1$, $L_2$, and $L_3$ to points 1 to 3 corresponding to the points other than the reference point M, that is, the markers other than the reference marker. In this case, the image processing apparatus in the first embodiment sets the reference point or the distances to the reference point again. Accordingly, in the first embodiment, the corresponding positions, in the three-dimensional space, corresponding to the points on the image plane on which at least four markers are projected can be more quickly calculated. As a result, in the first embodiment, information about the position and posture of a camera can be more quickly obtained.

Second Embodiment

An image processing program and an image processing apparatus in another embodiment of this disclosure will be described below.

(1) Apparatus Structure

Figure 15:
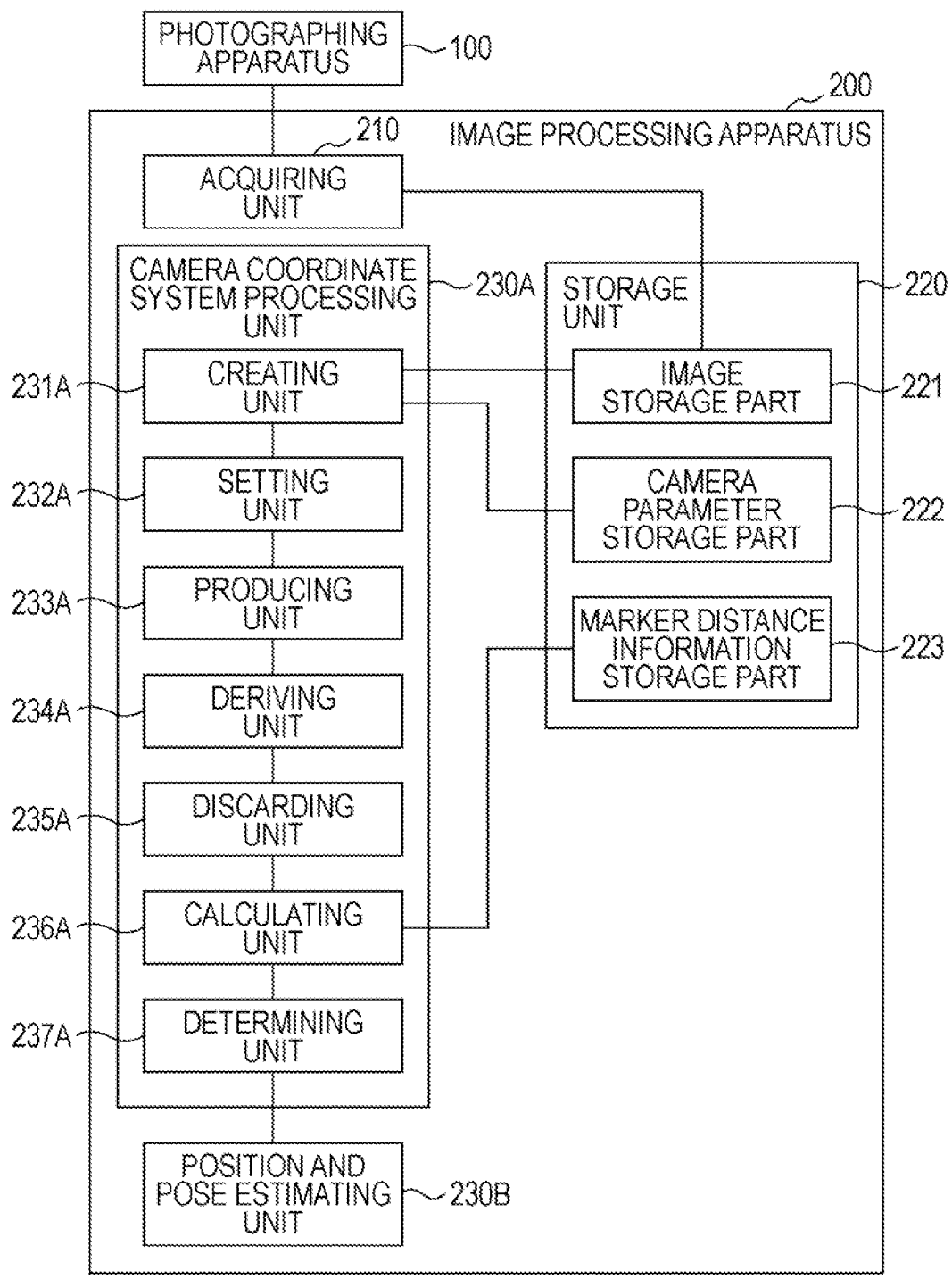
FIG. 15 is a functional block diagram of an image processing apparatus in a second embodiment.

The structure of the functional blocks of the image processing apparatus 200 in FIG. 2 is just a conceptual structure, and the functional blocks are not necessarily structured as depicted in the drawing. For example, the controller 230 in FIG. 2 may be functionally or physically divided into a camera coordinate system processing unit 230A and a position and pose estimating unit 230B as depicted in FIG. 15. Thus, the whole or part of the functional blocks of the image processing apparatus 200 can be functionally or physically divided and integrated as desired, according to various types of loads and the usage situation. FIG. 15 is a functional block diagram of an image processing apparatus in the second embodiment.

(2) Image Processing Program

The processes executed by the image processing apparatus 200 described in the first embodiment above can also be implemented by, for example, causing an electronic device, such as a microcomputer mounted in an electronic control unit (ECU) placed on a vehicle, to execute a prescribed program. Alternatively, these processes can be implemented by causing an electronic device, such as a microprocessor mounted in a robot or the like, to execute a prescribed program. An example of this type of electronic device will be described below with reference to FIG. 16. The electronic device in FIG. 16 executes an image processing program that implements functions similar to the processes executed by the image processing apparatus 200 described in the first embodiment.

Figure 16:
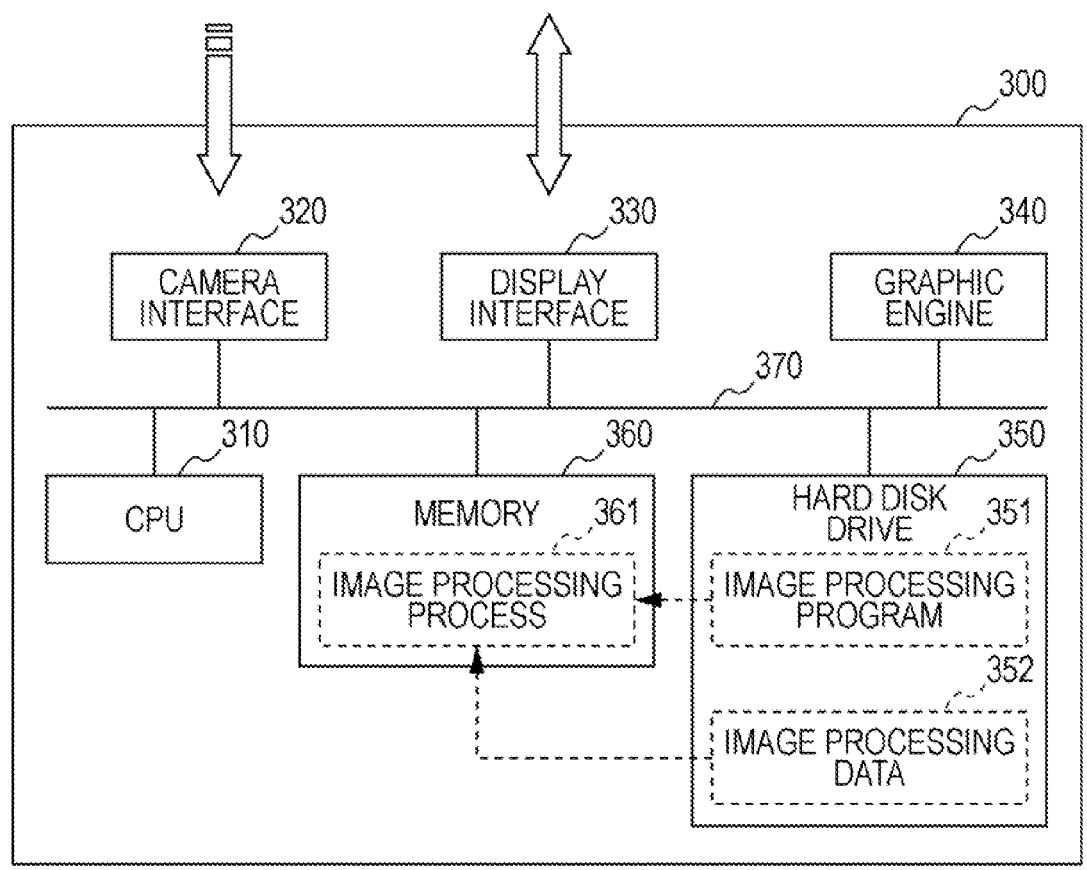
FIG. 16 illustrates an example of an electric device that executes an image processing program.
Figure 17:
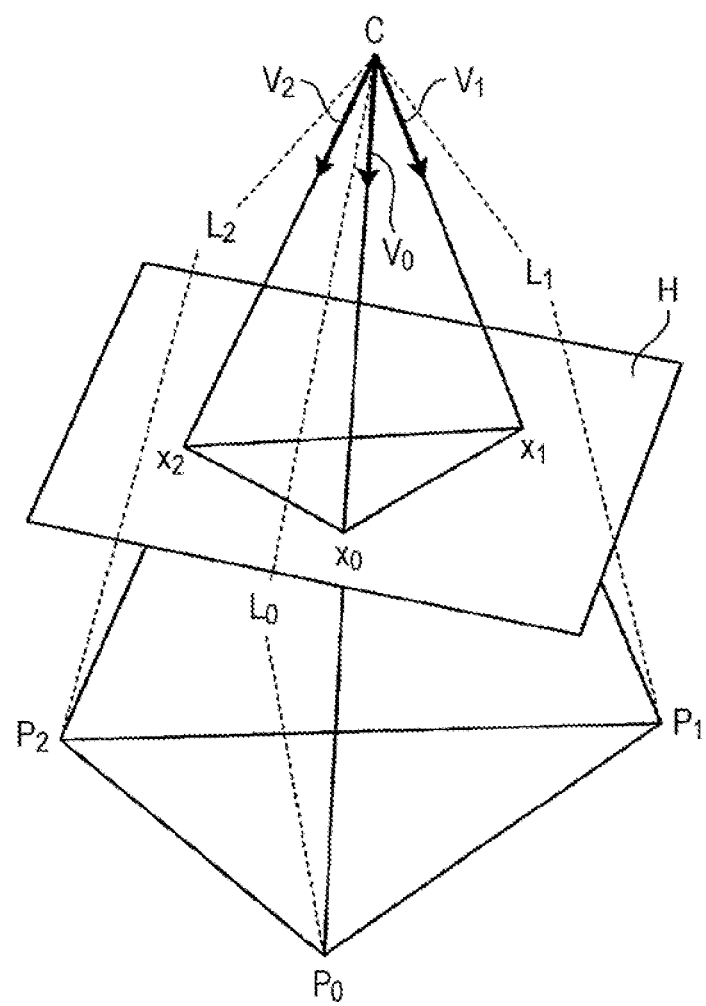
FIG. 17 illustrates known technology 1.

As illustrated in FIG. 16, an electronic device 300 that implements the processes executed by the image processing apparatus 200 has a central processing unit (CPU) 310 that carries out various calculations. The electronic device 300 also has a camera interface 320 through which images photographed by a camera are acquired as well as a display interface 330 through which data is transmitted to and received from a display unit, as illustrated in FIG. 16. The electronic device 300 also has a graphic engine 340 that functions as a hardware accelerator, as illustrated in FIG. 16.

As illustrated in FIG. 16, the electronic device 300 also has a hard disk drive 350 that stores a program and data used by the CPU 310 to implement the processes as well as a memory 360 such as a random access memory (RAM) in which various types of information is temporarily stored. These components 310 to 360 are connected to a bus 370.

An electronic circuit such as a micro processing unit (MPU) or an integrated circuit such as an application-specific integrated circuit (ASIC) or a field programmable gate array (FPGA), for example, can be used instead of the CPU 310. Non-volatile semiconductor memory devices such as flash memories can be used instead of the memory 360 and hard disk drive 350.

The hard disk drive 350 stores image processing data 352 and an image processing program 351 that implements functions similar to the processes executed by the image processing apparatus 200. It is also possible to appropriately distribute and store the image processing program 351 in storage units of other computers that is connected through a network so that communication is possible.

When the CPU 310 reads out the image processing program 351 from the hard disk drive 350 and stores the image processing program 351 in the memory 360, the image processing program 351 functions as an image processing process 361 as illustrated in FIG. 16. The image processing process 361 appropriately stores various types of data including the image processing data 352 read out from the hard disk drive 350 in an area allocated in the memory 360, and executes processes according to the stored various types of data. Although, as illustrated in FIG. 16, the image processing process 361 is subsidiarily stored in the memory 360 when it executes processes, strictly the image processing process 361 operates in the CPU 310.

Figure 14:
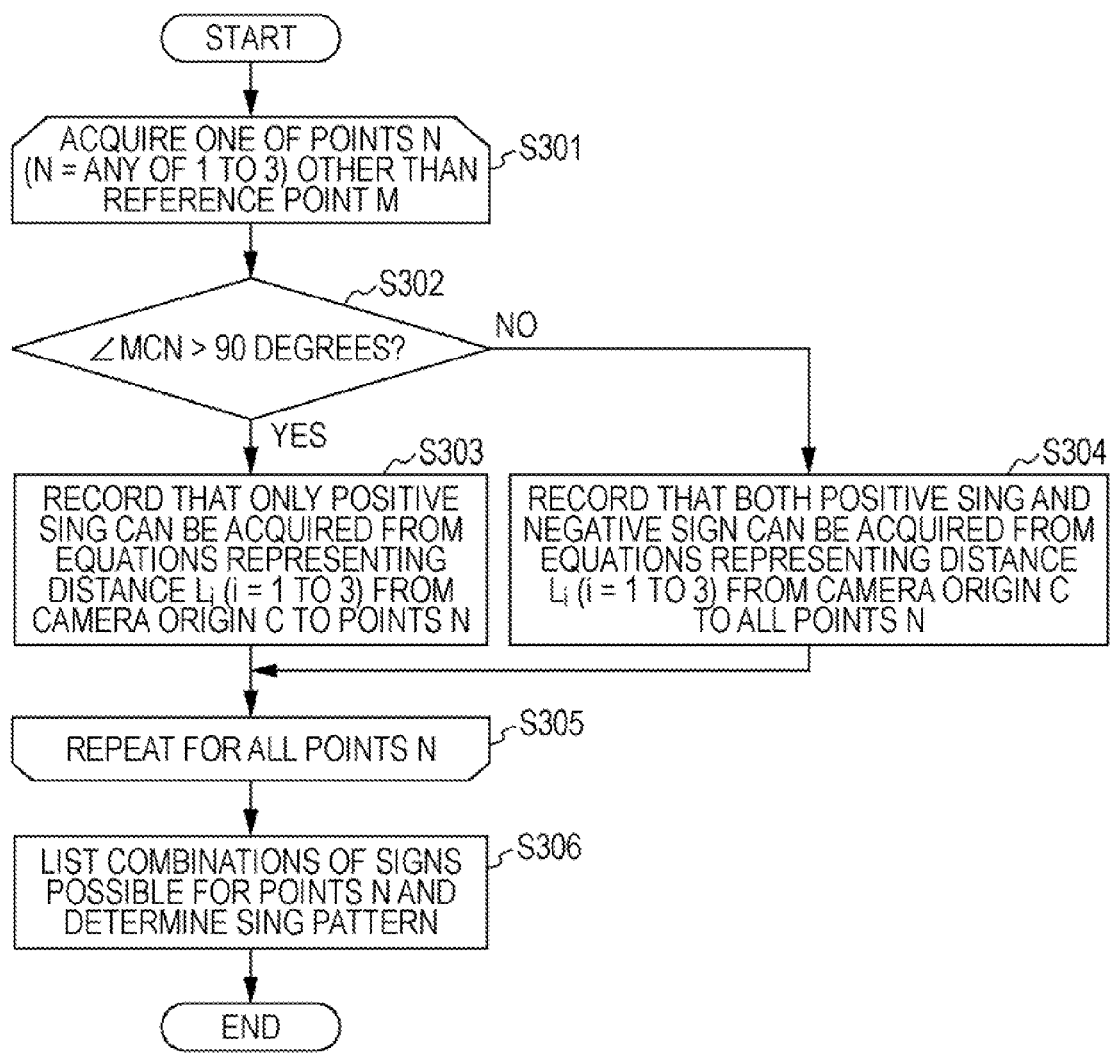
FIG. 14 illustrates a flow of a sign pattern determination process in the first embodiment.

The image processing process 361 includes processes executed by the controller 230 in the image processing apparatus 200 described in the first embodiment, which are processes illustrated in FIGS. 12 to 14, for example.

The image processing program 351 is not necessarily stored in the hard disk drive 350 in advance. For example, the programs of the image processing program 351 may be stored on transportable physical media, such as flexible disks (FDs), compact disk-read-only memories (CD-ROMs), digital versatile disks (DVDs), magneto-optical disks, and IC cards, that can be connected in drives compatible with the ECU in which the electronic device 300 is mounted. Then, the electronic device 300 may read out the image processing programs from these physical media and may execute the programs.

In addition, the programs may be stored in other computers (or servers) or the like connected to the ECU, in which the electronic device 300 is mounted, through a public circuit, the Internet, a local area network (LAN), a wide area network (WAN), or the like. Then, the electronic device 300 may read out the programs from the other computers and may execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory storage medium storing an image processing program causing a computer to execute processing of:
    obtaining an image, photographed with a camera, of at least four markers disposed in a real space;
    creating vectors, which correspond to the at least four markers, from the camera according to internal parameters including information about a focal length and an optical axis position of the camera and to a positions of the at least four markers on the image;
    selecting a reference marker from the at least four markers;
    calculating a inner product of a vector for the reference marker and a vector for each of remaining markers other than the reference marker;
    canceling, for markers, other than the reference marker, for which a sign of the inner product is negative, use of a negative sign included in an equation representing a solution of a quadratic equation that obtains a distance between the camera and a marker other than the reference marker by using the reference marker;
    creating sign patterns, for all markers other than the reference marker, by combining signs included in equations corresponding to the markers other than the reference marker according to a result of cancelling the use of the negative sign;
    setting a first value as a distance between the reference marker and the camera;
    calculating one or two candidates of a distance between the camera and each of the markers other than the reference marker, for the first value, by using the first value, the quadratic equation, and the result of cancelling the use of the negative sign;
    calculating error between an inter-marker distance in a real space and an inter-marker distance calculated according to each of the sign patterns and the one or two candidates, for each of the sign patterns;
    calculating other error for each of the sign patterns when a second value, which is different from the first value, is set;
    determining the distance between the camera and each of the at least four markers according to the error calculated when the first value is selected and to the other error calculated when the second value is selected; and
    calculating a position and a pose of the camera in a world coordinate system according to the determined distance between the camera and each of the at least four markers.

2. The non-transitory storage medium according to claim 1, wherein when, in the calculating error, error in a distance between a first marker other than the reference marker and a second marker, which is different from the first marker, other than the reference marker in a second sign pattern is smaller than the smallest error, which is calculated in advance, in a first sign pattern, error in a distance between a third marker and a fourth marker, which is different from the third marker, in the second sign pattern is calculated, the error in the distance between the first marker and the second marker, and the error in the distance between the third marker and the fourth maker are added.

3. The non-transitory storage medium according to claim 1, wherein the image processing program further causes the computer to execute processing of:

determining whether the solution given by the equation created by a process that produces the equation is a real number;

if a determination result is that the solution of the equation does not become a real number, executing a process to set a second value, which is different from the first value.

4. The non-transitory storage medium according to claim 3, wherein the first value and the second value fall within a numerical range determined in advance according to a designed position at which the camera is installed in a vehicle.

5. The non-transitory storage medium according to claim 4, wherein the image processing program further causes the computer to execute processing of storing the position and the pose of the camera in the world coordinate system in a storage area provided in the vehicle.

6. An image processing apparatus, comprising:

an acquiring unit that obtains an image, photographed with a camera, of at least four markers disposed in a real space;

a creating unit that creates vectors, which correspond to the at least four markers, from the camera according to internal parameters including information about a focal length and an optical axis position of the camera and to a positions of the at least four markers on the image;

a setting unit that selects a reference marker from the at least four markers and sets a first value as a distance between the reference marker and the camera or a second value, which differs from the first value;

a discarding unit that calculates a inner product of a vector for the reference marker and a vector for each of remaining markers other than the reference marker, cancels use of a negative sign included in an equation representing a solution of a quadratic equation that obtains a distance between the camera and a marker other than the reference marker by using the reference marker, for markers, other than the reference marker, for which a sign of the inner product is negative, and creates sign patterns, for all markers other than the reference marker, by combining signs included in equations corresponding to the markers other than the reference marker according to a result of cancelling the use of the negative sign;

a calculating unit that calculates one or two candidates of a distance between the camera and each of the markers other than the reference marker, for the first value, by using the first value, the quadratic equation, and the result of cancelling the use of the negative sign, and calculates error between an inter-marker distance in a real space and an inter-marker distance calculated according to each of the sign patterns and the one or two candidates, for each of the sign patterns;

a determining unit that calculates other error for each of the sign patterns when a second value, which is different from the first value, is set by the setting unit, and determines the distance between the camera and each of the at least four markers according to the error calculated when the first value is selected and to the other error calculated when the second value is selected; and an operation unit that calculates a position and a pose of the camera in a world coordinate system according to the determined distance between the camera and each of the at least four markers.

* * * * *